Patented June 5, 1934

1,962,109

UNITED STATES PATENT OFFICE 1,962,109

FUNGICIDES AND BACTERICIDES

Earl B. Alvord, Cleveland Heights, Ohio, assignor to The Grasselli Chemical Company, Cleveland, Ohio, a corporation of Delaware No Drawing. Application July 18, 1931, Serial No. 551,792

10 Claims. (Cl. 167—33)

The greatest enemies to human well being and their supply of foodstuffs are insects and microorganisms. Considerable effort and ingenuity have been expended on finding ways and means to fight such parasites. In that part of the fight which is particularly directed to the preservation of vegetable life and vegetable matter it has in most instances been found that micro-organisms and insects have to be fought with different weapons, which is, of course, quite natural when one considers the different organization, mode of living and size of micro-organisms and insects. While chemical means are some of the most common weapons employed in our war against insects and micro-organisms, it is only in exceptional cases that the same chemical will be effective against both insects and micro-organisms without being toxic to higher forms of life. Considering the protection of living plants, we see that arsenicals, nicotine, and in more recent times fluosilicates or fluorides have been of invaluable help in the protection against various insects, whereas these same materials are practically powerless in the protection from the ravages of fungi or micro-organisms. On the other hand, the commonest fungicide, sulfur, does in no manner hamper the development of insects thriving on vegetable material.

It is shown by Elmer K. Bolton in an application for Letters Patent Ser. No. 551,791, filed on even date herewith that certain organic, heterocyclic carbon-nitrogen-sulfur compounds have a specific toxic effect against aphids, flies and other insect pests.

I have found that chemicals belonging similarly to a class of organic heterocyclic carbon-sulfur-nitrogen compounds are agents which are particularly suited to combat various micro-organisms, such as fungi, or bacteria, and my invention comprises fungicides which are substances containing in their molecules a five membered heterocyclic carbon-sulfur-nitrogen ring to which is attached a salt forming group and certain of their derivatives.

Considering the complexity of the problem of protecting organized materials from the attack of both insects and micro-organism, one can easily realize the great practical advantage that will result from the use of a single type of material which will be effective in the control of insects, as well as fungi and bacteria.

My invention comprises therefor the use as bactericides and fungicides, that is to say for controlling micro-organisms, of a group of organic substances consisting of substances which contain in their molecule a heterocyclic five membered ring consisting of carbon, sulfur and nitrogen atoms and which have a salt forming substituent attached to the ring, or nucleus, their salts and esters, as well as the alkyl, aryl and acyl derivatives of their salt forming groups.

The arrangement of the atoms in the five membered ring and the other atoms or radicals attached to four of the members of the ring do not seem to be of fundamental importance in respect to the toxicity of the compounds towards fungi or bacteria, though these factors have a pronounced effect upon the degree of toxicity and other physical or chemical properties which influence the availability of the compounds for controlling micro-organisms.

Among the several species of heterocyclic, five membered ring compounds containing carbon, nitrogen and sulfur and carrying a salt forming group, the thiazole derivatives are both as to their toxicity and technical availability particularly adapted for use against micro-organisms.

The thiazoles can be represented by the skeleton formula

and the term thiazole is used for the purposes of this invention irrespective of the saturation of the nucleus, that is to say formulation with single or double bonds between the atoms of the nucleus. As a matter of fact, many of the thiazoles exhibit properties which at present are explained by the assumption that the compounds exist as an equilibrium between tautomeric forms which can be formulated as keto and enol type compounds such as

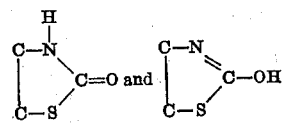

The salt forming groups which when attached to one of the carbon atoms of the five membered nucleus, whereby the bactericidal and fungicidal properties are fully developed, can be of an acidic or basic nature; the acidic groups can be exemplified by —SH, —OH, —S—$CH_2$—COOH, and other carboxylic, etc. groups. The basic groups may be —$NH_2$ and its substitution products, such as alkyl, aryl, acyl, etc.

Aliphatic as well as aromatic thiazoles are easily accessible by relatively simple synthetic processes. The following is a representative list of thiazoles which I found to be specifically toxic towards micro-organisms:

Pseudo-thio-hydantoin, or 2-imino-4-thiazolidone

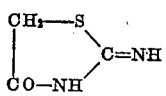

2,4-diketo-tetrahydro-thiazole, or 2,4-thiazoledione

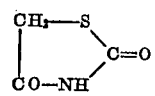

Rhodanin

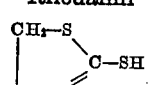

4-methyl-2-amino-thiazole

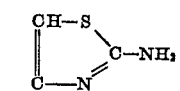

1-amino-benzo-thiazole

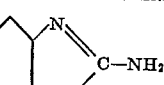

1-hydroxybenzo-thiazole

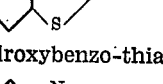

Mercapto-benzo-thiazole

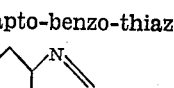

1-amino-alpha-naphtho-thiazole

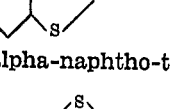

5-ethoxy-1-amino-benzo-thiazole

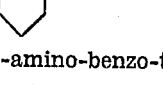

3-methyl-1-amino-benzo-thiazole

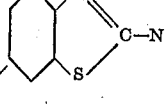

5-chloro-1-amino-benzo-thiazole

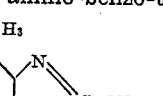

1-4-diamino-benzo-thiazole

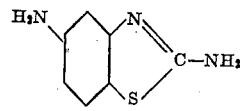

5-hydroxy-1-amino-benzo-thiazole

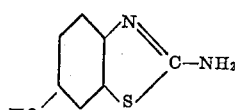

Benzthiazyl-thioglycollic-acid

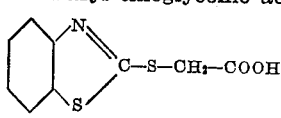

These compounds all contain the five membered thiazole nucleus and a salt forming group attached to one of the carbon atoms of the nucleus.

The toxicity of these compounds towards micro-organisms is not limited to these basic or respectively acid substances, and their respective salts partake in this property. The amino-thiazoles can, for instance, be combined with hydrochloric, sulfuric and many other inorganic or organic acids to form salts which exhibit in a broad manner the toxic properties of the thiazole bases. Similarly the acidic thiazoles, such as the mercapto, hydroxy, carboxylic derivatives form stable salts with alkalies, ammonia, heavy metals, such as Cu, Hg, Zn, etc., organic bases, etc., and there again the toxic properties are carried over into the salts.

It appears furthermore that the salt forming groups of the thiazoles can be substituted without materially affecting the toxicity of the thiazole nucleus. Esters, or ethers and anhydrids of the acidic thiazole have substantially similar toxicity to that of the free acids and their salts. Similarly the toxicity of amino-thiazoles is maintained in their derivatives in which the amino-group carries hydrocarbon or acyl (—O—R) substituents.

The carrying over of the fungicidal properties from the straight, salt forming thiazoles, into their salts, esters and other substitution products is of great practical importance as it permits of changing the physical properties of the active material without substantially modifying its useful bactericidal and fungicidal properties and gives a great latitude in the methods of applying these substances to the control of micro-organisms. Salt formation, esterification and other substitution in the salt forming group change the solubility of the substances in water, mineral oil and other vehicles used to disperse or apply the toxic substances to organized material, such as living plants, wood, textiles, etc. Of greater importance is the fact that by combining a weak base with a strong acid a salt may be formed which shows an acid reaction in water, or vice versa, and it is thereby possible to supply the same active substance in an alkaline or acid form, as may be desired, in view of the lesser or greater tolerance of various insects for acid or alkaline materials.

The neutral organic derivatives are in general more easily emulsified and thereby become available in a form which may be better suited for particular applications.

My novel bactericides and fungicides are in general suited for controlling various micro-organisms, such as fungi and bacteria which thrive upon organized materials, such as living plants, wood, textiles and other materials fabricated from vegetable or animal tissues.

My novel agents for the control of micro-organisms are applied in manners similar to agents used heretofore. For spraying plants I use aqueous solutions or suspensions. For wood preservation I impregnate the wood with aqueous or oily solutions or emulsions. I can also apply my agents in dust form with or without inert diluents or in admixture with other agents. The dust form is, for instance, suited to treating seeds or other reproducing organisms of plants.

Excellent control of Fomes annosus, a fungus living on wood has, for instance, been obtained by applying aqueous solutions of mercaptobenzothiazole and its salts or amino-benzothiazole and its substitution products and salts in concentration of 0.1% down to 0.01% to cultures of this fungus.

Excellent control has also been obtained on various pathogenic fungi by the application of aqueous solutions of amino, hydroxy, or mercaptothiazoles and their salts. A few of the fungi thriving on living plants against which thiazoles have been tested successfully are listed below.

*Sclerotinia cinerea*, a parasite on stone fruit, causing rot. This was, for instance, successfully controlled by aqueous solutions of 0.1% and less 5-ethoxy-1-amino-benzo-thiazole hydrochloride, sodium salt of mercaptobenzo-thiazole or 5-chlor-1-amino-benzo-thiazole.

Perfect control has also been obtained by these same agents on *Phoma pomi*, the cause of Brock's spot on apples, which resists sulfur, and on *Glomerella cingulata*.

Germination has been completely suppressed when 0.1% aqueous solutions of 5-ethoxy-1-amino-thiazole hydrochloride were applied to cultures of *Verticillium albo-atrum*, a fungus found on maple, elm, tomatoes, etc.; *Phomopsis*, the cause of twig blight on elm trees, *Graphium ulmi*, the cause of the Dutch elm disease, *Thielavia basicola*, a tobacco fungus, *Fusarium moniliforme*, a parasite of wheat and corn which is resistant to most fungicides.

On *Botrytis cinerea* a quite commonly found fungus, which causes, for instance, lettuce drop, applications of aqueous solutions from 0.1% down to 0.01% of 5-ethoxy-1-amino-thiazole hydrochloride, sodium salt of mercaptobenzo-thiazole and the hydrochloride of 5-chlor-1-amino-benzo-thiazole have produced complete control.

It is in general advisable in using my novel fungicides in aqueous solution or suspension to add to the composition a substance which improves the distribution of the composition over the material to be protected. Such substances are generally of the type of protective colloids or act as deflocculating and/or wetting agents. Sulfonated oils, gums, gelatinous materials, soaps, caseinates, etc. have in general the properties desired. They are commonly called spreaders and their use with my novel fungicides enhances in a remarkable manner the toxicity towards various micro-organisms.

As a rule I prefer to use my novel fungicides in solution or suspension containing less than 1% of my active ingredients. I add to such compositions from ¼ to ½% of a spreader, as these proportions were found to most effectively bring out the toxicity of the thiazole compounds, though lesser or larger amounts can be used to advantage in many instances and depending on special circumstances.

The fungicidal experiments, the results of which are listed above, have all been made with compositions containing from ¼ to ½% of a spreader, such as a fishoil soap or a sulfonated mineral oil.

The fungicidal and bactericidal action exemplified above is in no way limited to the specific compounds mentioned above, nor to the particular micro-organisms and it will be understood that my invention is not limited to these particular applicatons, but it is directed to the use generally of substances containing the five membered heterocyclic, carbon, sulfur, nitrogen ring which have a salt forming group attached to this nucleus and their salts, esters and other substitution products which I have found to be toxic towards various pathogenic micro-organisms thriving on organized materials.

While the toxicity towards micro-organisms seems to be general to substances containing the heterocyclic carbon, sulfur, nitrogen five membered ring, it appears from my present knowledge that such compounds are preferred in which 2 carbon atoms of the nucleus are parts of an aromatic ring and in which the 3rd carbon atom carries a sulfhydryl or amino substituent.

I claim:

1. An agent for the control of pathogenic micro-organisms thriving on organized materials comprising an organic substance containing in its molecule a five membered ring composed of 3 carbons, one nitrogen and one sulfur atom, one of said carbon atoms carrying a salt forming group.

2. An agent for the control of pathogenic micro-organisms thriving on organized materials comprising an organic substance containing in its molecule the heterocyclic nucleus 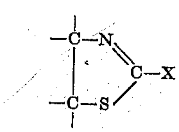 in which X is a salt forming group.

3. An agent for the control of pathogenic micro-organisms thriving on organized materials comprising an organic substance containing in its molecule the heterocyclic nucleus 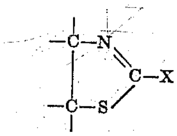 in which X is a salt forming group and in which the other two carbon atoms are parts of an aromatic ring.

4. A wood preservative comprising a mercaptobenzothiazole salt.

5. A fungicide comprising an aqueous composition containing a spreader and a thiazole containing a salt forming group attached to one of the carbon atoms of the thiazole nucleus.

6. A fungicide comprising an aqueous composition containing a spreader of the class of spreaders consisting of soaps and sulfonated oils and a thiazole containing a salt forming group attached to one of the carbon atoms of the thiazole nucleus.

7. A fungicide and bactericide comprising a thiazole of the formula

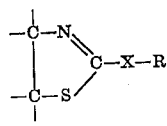

in which X is one of the elements N, O and S and R is hydrogen or an atom or atom grouping which can replace hydrogen when it exercises its acidic functions.

8. A fungicide and bactericide comprising a thiazole of the formula

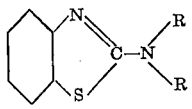

in which R is hydrogen, a hydrocarbon or an acyl radical.

9. A fungicide and bactericide comprising a thiazole of the formula

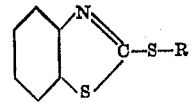

in which R is hydrogen or an atom or atom grouping which can replace hydrogen when it exercises its acidic functions.

10. A fungicide and bactericide comprising a thiazole of the formula

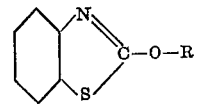

in which R is hydrogen or an atom or atom grouping which can replace hydrogen when it exercises its acidic functions.

EARL B. ALVORD.